United States Patent
Takeda et al.

(10) Patent No.: US 11,284,371 B2
(45) Date of Patent: Mar. 22, 2022

(54) METHOD AND DEVICE EXECUTING BEAMFORMING PROPERLY EVEN WHEN TERMINALS ARE IN IDLE MODE

(71) Applicant: NTT DOCOMO, INC., Tokyo (JP)

(72) Inventors: Kazuaki Takeda, Tokyo (JP); Hiroki Harada, Tokyo (JP); Kazuki Takeda, Tokyo (JP); Satoshi Nagata, Tokyo (JP); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 547 days.

(21) Appl. No.: 16/322,536

(22) PCT Filed: Aug. 3, 2017

(86) PCT No.: PCT/JP2017/028161
§ 371 (c)(1),
(2) Date: Feb. 1, 2019

(87) PCT Pub. No.: WO2018/025947
PCT Pub. Date: Feb. 8, 2018

(65) Prior Publication Data
US 2021/0337503 A1    Oct. 28, 2021

(30) Foreign Application Priority Data
Aug. 4, 2016  (JP) .............................. JP2016-154017

(51) Int. Cl.
*H04W 68/00*     (2009.01)
*H04W 24/08*     (2009.01)
(Continued)

(52) U.S. Cl.
CPC ......... *H04W 68/005* (2013.01); *H04W 24/08* (2013.01); *H04W 72/005* (2013.01); *H04W 72/042* (2013.01); *H04W 72/046* (2013.01)

(58) Field of Classification Search
CPC . H04W 68/005; H04W 24/08; H04W 72/042; H04W 72/046; H04W 68/00;
(Continued)

(56) References Cited

U.S. PATENT DOCUMENTS 5,708,441 A    1/1998  Kanai
6,233,466 B1 *  5/2001  Wong ..................... H01Q 1/246
                                                        370/342

(Continued)

FOREIGN PATENT DOCUMENTS

JP     S53-13802 A    2/1978
JP     H08-331040 A   12/1996
(Continued)

OTHER PUBLICATIONS

International Search Report issued in PCT/JP2017/028161 dated Oct. 3, 2017 (2 pages).

(Continued)

*Primary Examiner* — Mewale A Ambaye
(74) *Attorney, Agent, or Firm* — Osha Bergman Watanabe & Burton LLP

(57) ABSTRACT

The present invention is designed so that beamforming can be executed properly even when user terminals are in idle mode. A user terminal according to the present invention communicates with a radio base station that uses a plurality of beam patterns, and has a receiving section that performs a receiving process for paging information which is transmitted in varying beam patterns, in a paging time period comprised of a plurality of unit periods, and a transmission section that transmits a response signal in response to receipt of the paging information.

5 Claims, 17 Drawing Sheets

(51) Int. Cl.
*H04W 72/00* (2009.01)
*H04W 72/04* (2009.01)

(58) Field of Classification Search
CPC ..... H04W 52/48; H04W 24/04; H04W 28/16; H04W 16/28; H04L 4/45
See application file for complete search history.

(56) References Cited

U.S. PATENT DOCUMENTS

| | | | |
|---|---|---|---|
| 2009/0129343 A1 | 5/2009 | Kobayashi | |
| 2011/0038317 A1 | 2/2011 | Nuno et al. | |
| 2014/0086173 A1* | 3/2014 | Sadeghi | H04W 72/042 370/329 |
| 2016/0255660 A1 | 9/2016 | Son et al. | |
| 2017/0331670 A1* | 11/2017 | Parkvall | H04L 41/0233 |
| 2018/0270713 A1* | 9/2018 | Park | H04W 74/0833 |
| 2019/0373580 A1 | 12/2019 | Choi | |
| 2020/0351844 A1* | 11/2020 | Rico Alvarino | H04W 24/08 |
| 2021/0105851 A1* | 4/2021 | Kim | H04W 68/02 |
| 2021/0135928 A1* | 5/2021 | Yi | H04W 72/14 |

FOREIGN PATENT DOCUMENTS

| | | |
|---|---|---|
| JP | 2012521731 A | 9/2012 |
| WO | 2008010277 A1 | 1/2008 |
| WO | 2009119575 A1 | 10/2009 |
| WO | 2012125093 A1 | 9/2012 |
| WO | WO-2012125093 A1 * | 9/2012 ............ H04W 68/02 |
| WO | 2015-069090 A1 | 5/2015 |

OTHER PUBLICATIONS

Written Opinion of the International Searching Authority issued in PCT/JP2017/028161 dated Oct. 3, 2017 (3 pages).
Samsung; "RAN2 aspects of high frequency New RAT"; 3GPP TSG-RAN WG2 Meeting #93bis, R2-162251; Dubrovnik, Croatia; Apr. 11-15, 2016 (9 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Office Action issued in counterpart European Patent Application No. 17837048.2, dated Jun. 15, 2021 (5 pages).
Extended European Search Report issued in the counterpart European Patent Application No. 17837048.2, dated Feb. 20, 2020 (8 pages).
Office Action issued in European Application No. 17837048.2; dated Nov. 27, 2020 (6 pages).
Office Action issued in Chinese Application No. 201780048772.4 dated Aug. 31, 2021.
Office Action issued in Japanese Application No. 2018-531968; dated Oct. 12, 2021 (6 pages).

* cited by examiner

METHOD AND DEVICE EXECUTING BEAMFORMING PROPERLY EVEN WHEN TERMINALS ARE IN IDLE MODE

TECHNICAL FIELD

The present invention relates to a user terminal, a radio base station and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "New RAT (Radio Access Technology)," "FX (Future generation radio access)," "LTE Rel. 13," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. In addition, in CA, multiple CCs under the same radio base station (eNB (eNodeB)) are configured in a user terminal (UE (User Equipment)).

Meanwhile, in LTE Rel. 12, dual connectivity (DC), by which multiple cell groups (CGs) are formed by different radio base stations and configured in UE, is also introduced. Each cell group is comprised of at least one cell (CC). Since multiple CCs of different radio base stations are aggregated in DC, DC is also referred to as "inter-base station CA (inter-eNB CA)."

Also, in existing LTE systems (for example, LTE Rel. 8 to 13), in order to reduce the power consumption of user terminals, the operation of discontinuous reception (DRX) in idle mode is supported. Also, user terminals in idle mode control measurements of RSRP/RSRQ for cell reselection, monitoring/reception of the paging channel (PCH), and so on, based on the DRX cycle. Incoming calls, changes of broadcast information (system information), ETWS, and so on are reported to user terminal via the paging channel.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Future radio communication systems (for example, 5G, NR, etc.) are anticipated to implement various radio communication services by fulfilling various requirements (for example, ultra-high speed, large capacity, ultra-low latency, and so on).

For example, in 5G, research has been conducted to provide radio communication services, referred to as "eMBB (enhanced Mobile Broad Band)," "IoT (Internet of Things)," "MTC (Machine Type Communication)," "M2M (Machine To Machine)," "URLLC (Ultra Reliable and Low Latency Communications)" and so on. Note that M2M may be referred to as "D2D (Device To Device)," "V2V (Vehicle To Vehicle)" and so on, depending on what communication device is used. To fulfill the requirements for various types of communication such as listed above, studies are in progress to design new communication access schemes (new RAT (Radio Access Technology)).

For 5G, studies are underway to provide services using a very high carrier frequency of 100 GHz, for example. Generally speaking, it is more difficult to secure coverage when the carrier frequency increases. Reasons for this include that the distance-induced attenuation becomes more severe and the rectilinearity of radio waves becomes stronger, the transmission power density decreases because ultra-wideband transmission is performed, and so on.

Therefore, in order to fulfill the requirements for various types of communication such as those mentioned above even in high frequency bands, there are on-going studies to examine the use of massive MIMO (Multiple Input Multiple Output), which uses a very large number of antenna elements. When a very large number of antenna elements are used, beams (antenna directivities) can be formed by controlling the amplitude and/or the phase of signals transmitted/received in each element. This process is also referred to as "beamforming (BF)," and makes it possible to reduce the propagation loss of radio waves.

A radio base station that uses beamforming can communicate properly by applying appropriate transmitting beams (beam patterns) to each user terminal and transmitting and/or receiving signals accordingly. Meanwhile, the radio base station cannot determine which beam pattern is appropriate for user terminals that are in idle mode. Therefore, a method for transmitting and/or receiving signals that are suitable for user terminals in idle mode and so on, by using beamforming, is in demand.

The present invention has been made in view of the above, and it is therefore an object of the present invention to provide a user terminal, a radio base station and a radio communication method that allow beamforming to be executed properly even when user terminals are in idle mode.

Solution to Problem

A user terminal according to one aspect of the present invention communicates with a radio base station that uses a plurality of beam patterns, and has a receiving section that performs a receiving process for paging information which is transmitted in varying beam patterns, in a paging time period comprised of a plurality of unit periods, and a transmission section that transmits an uplink signal.

Advantageous Effects of Invention

According to the present invention, it is possible to execute beamforming properly even when user terminals are in idle mode.

DESCRIPTION OF EMBODIMENTS

In existing LTE systems, a user terminal in RRC idle mode detects downlink control information (DCI) that is transmitted in a common search space (common SS) in a downlink control channel (PDCCH), at a predetermined paging timing. Then, based on the scheduling information (DL assignment) contained in this DCI, the user terminal acquires a paging message that is transmitted in a downlink shared channel (PDSCH). Note that, as for the DCI, DCI (DCI format 1A or DCI format 1C) that is scrambled by using a paging identifier (P-RNTI) is used.

The paging message that is transmitted from the radio base station can contain notifications of each user terminal's paging record, information to order a change of system information (for example, SystemInfoModification), ETWS (Earthquake and Tsunami Warning System), CMAS (Commercial Mobile Alert Service), EAB (Extended Access Barring) and so on.

The paging timing at which a user terminal detects the paging channel is configured based on a paging occasion (PO), which specifies the subframe in which P-RNTI-scrambled DCI is transmitted, and the radio frame (PF (Paging Frame)) in which the PO is contained. The user terminal monitors for the paging channel based on the PO and the PF. When the user terminal is in idle mode, the user terminal can save its power consumption by performing the receiving operation (DRX) only during the period the user terminal needs to monitor for the paging channel, and by assuming sleep mode or power-save mode during other periods. Note that the paging channel may be regarded as a configuration that accommodates a downlink control channel, which transmits DCI that is scrambled with P-RNTIs, and a downlink shared channel, allocation of which is commanded by this DCI, and in which the paging message is transmitted.

Figure 1:
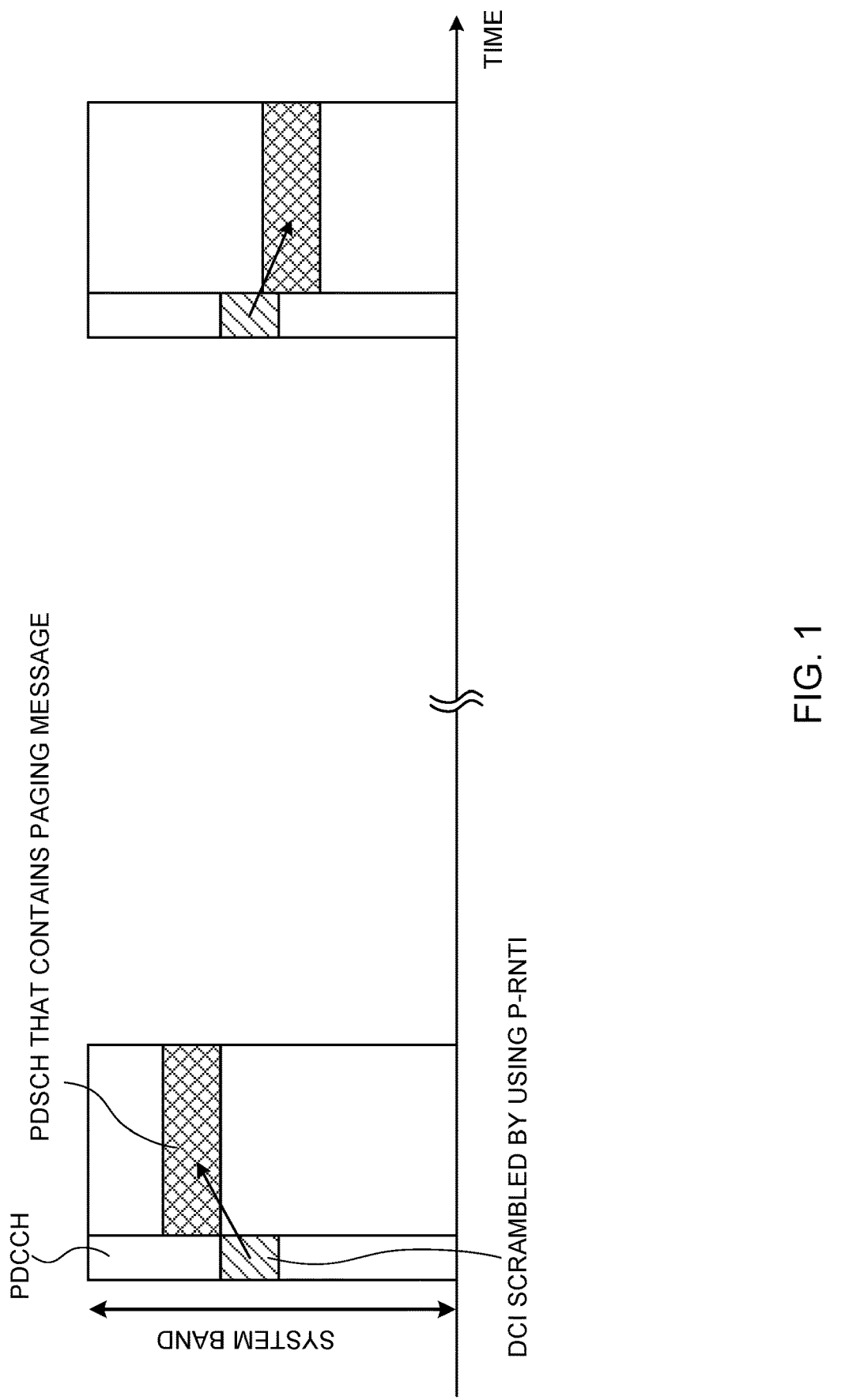
FIG. 1 is a diagram to show an example of the method of transmitting and receiving paging information in existing systems.
Figure 2:
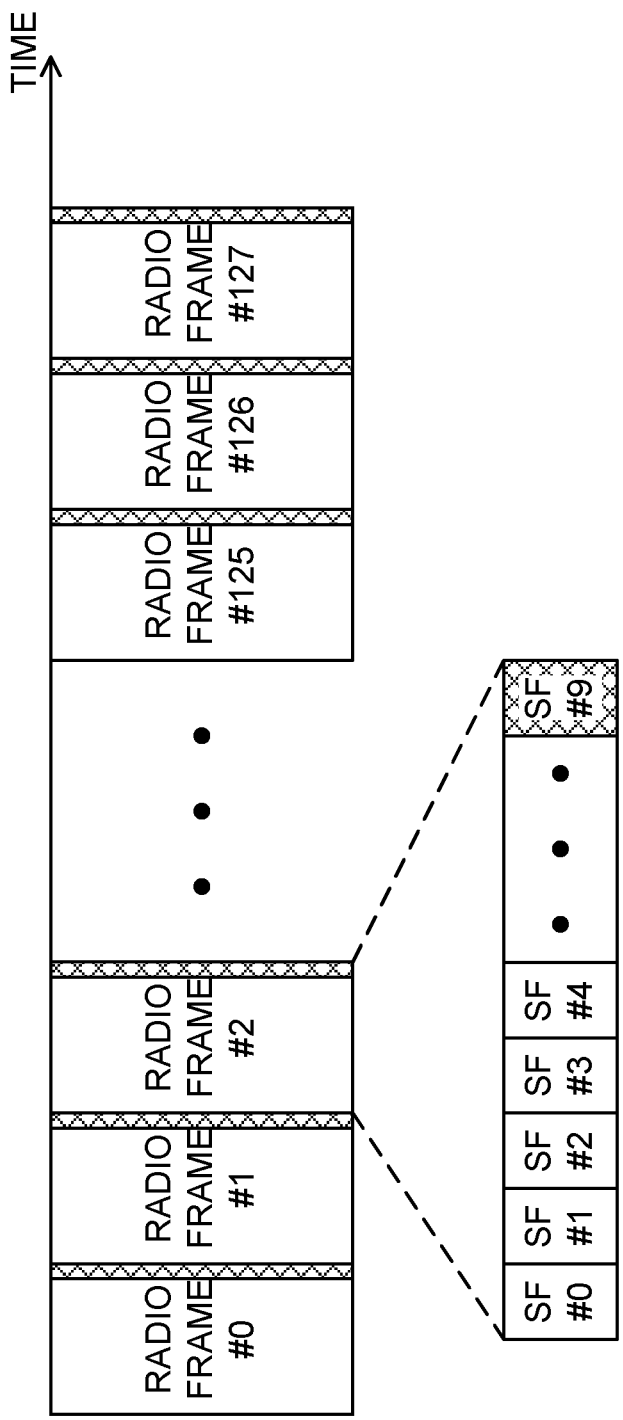
FIG. 2 is a diagram to show an example of the method of allocating paging information in existing systems.

Each user terminal's paging timing (PF and PO) is determined by an IMSI (International Mobile Subscriber Identity), a paging cycle (T) and a variable (nB). For example, in the event the DRX cycle is 128 radio frames and nB=T, a given user terminal that uses FDD exerts control so that paging channel receiving processes take place in a predetermined subframe (for example, subframe #9) in each radio frame (see FIG. 2). Note that, in the event FDD is used, as shown in FIG. 2, synchronization signals (PSS/SSS) are transmitted in subframes #0 and #5, and the broadcast channel (PBCH), to which the MIB is allocated, is transmitted in subframe #0.

As described above, in existing LTE systems, the receiving operation for the paging channel is executed at paging timings that are determined based on predetermined parameters (IMSI, paging cycle (T), variable (nB), etc.).

Now, future radio communication systems (for example, 5G, NR, etc.) are anticipated to implement various radio communication services by fulfilling various requirements (for example, ultra-high speed, large capacity, ultra-low latency, etc.). For example, for future radio communication systems, as mentioned earlier, studies are in progress to perform communication by using beamforming (BF).

BF can be classified into digital BF and analog BF. Digital BF refers to a set of techniques where precoding signal processing is executed on baseband signals (for digital signals). In this case, inverse fast Fourier transform (IFFT)/digital-to-analog conversion (DAC)/RF (Radio Frequency) need to be carried out in parallel processes, as many as the number of antenna ports (RF chains). Meanwhile, it is possible to form a number of beams to match the number of RF chains at an arbitrary timing.

Analog BF refers to a set of techniques to apply phase shifters to RF signals. In this case, since it is only necessary to rotate the phase of RF signals, analog BF can be implemented with simple and inexpensive configurations, but it is not possible to form multiple beams at the same time. To be more specific, when analog BF is used, each phase shifter can only form one beam at a time.

Therefore, if a base station (for example, referred to as an "eNB (evolved Node B)," a "BS (Base Station)," and so on) has only one phase shifting device, only one beam can be formed at a given time. It then follows that, when multiple beams are transmitted using analog BF alone, these beams cannot be transmitted simultaneously using the same resources, and the beams need to be switched, rotated and so on, over time.

Note that it is also possible to adopt a hybrid BF configuration, which combines digital BF and analog BF. While studies are on-going to introduce massive MIMO in future radio communication systems (for example, 5G), attempting to form an enormous number of beams with digital BF alone might lead to an expensive circuit structure. For this reason, it is more likely that a hybrid BF configuration will be used in 5G.

Figure 3B:
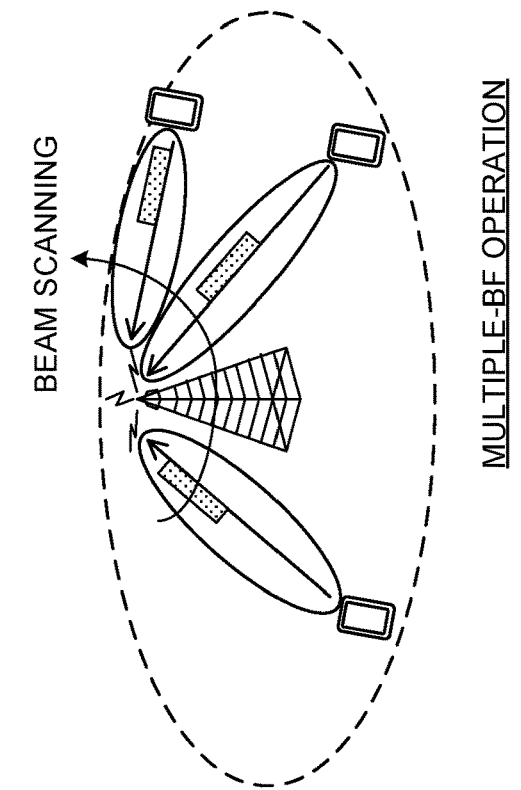
FIG. 3B is a diagram to show an example of multiple BF.
Figure 3A:
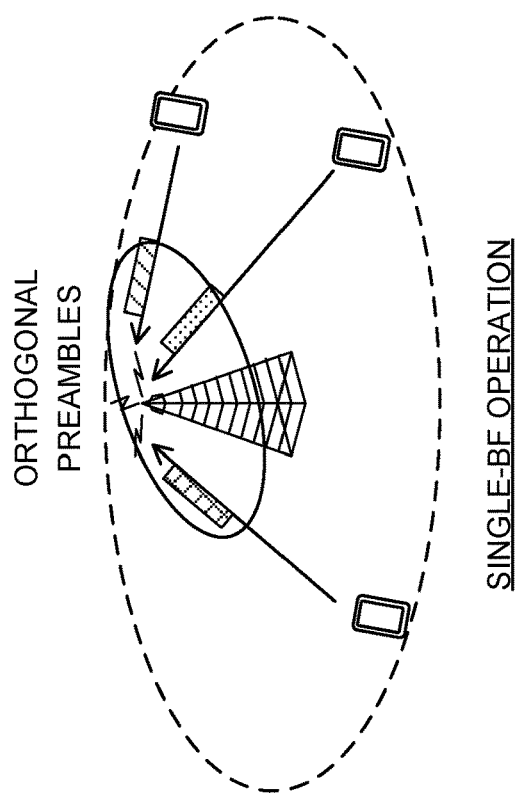
FIG. 3A is a diagram to show an example of single BF.
Figure 4A:
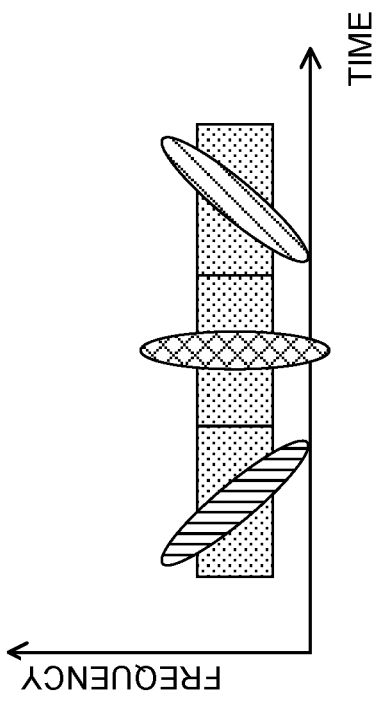
FIG. 4A is a diagram to show an example of single BF.

As for the operation of BF, there are single-BF operation to use one BF, and multiple-BF operation to use multiple BFs (see FIG. 3 and FIG. 4). In UL transmission using single-BF operation, orthogonal preambles are used so that UL beams (directivities) are orthogonal to each other among a plurality of user terminals (to avoid collisions) (see FIG. 3A). Therefore, as shown in FIG. 4A, the same resource can be used in the frequency domain-time domain.

Figure 4B:
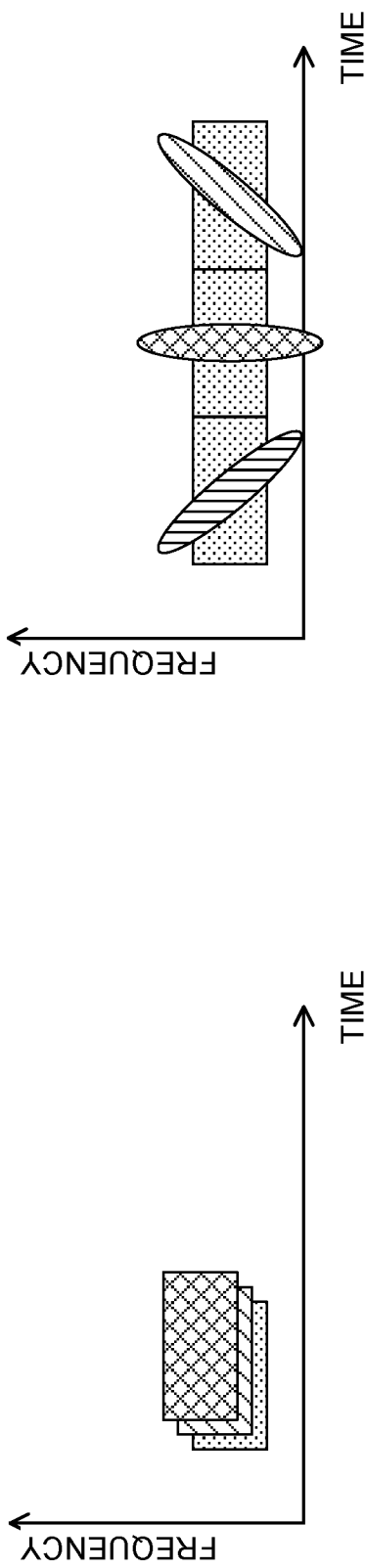
FIGS. 4B and 4C are diagrams to show examples of multiple BF.
Figure 4C:
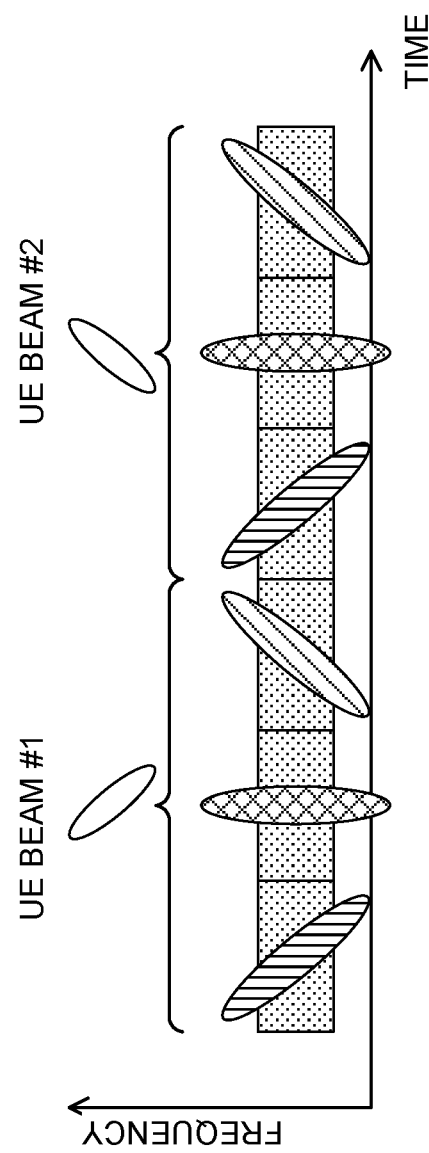

In UL transmission to use multiple-BF operation, BF is applied so that UL beams (directivities) are orthogonal to each other among a plurality of user terminals (to avoid collisions). For example, in multiple-BF operation, transmission may be made a number of times in the time direction by applying different beam patterns, so as to select an optimal receiving directivity (beam sweep) (see FIG. 3B). FIG. 4B shows an example of multiple-BF operation in a radio base station (also referred to as a "gNB"). In this case, the radio base station receives signals from user terminals in varying receiving directivities in a plurality of unit periods. FIG. 4C shows an example of multiple-BF operation in a radio base station and a user terminal. In this case, too, the radio base station receives signals from the user terminal in different receiving directivities in multiple unit periods. Meanwhile, the user terminal transmits signals in specific transmitting directivities (UE beam #1 and UE beam #2 in FIG. 4C).

In multiple-BF operation, it is possible to reduce the number of orthogonal preambles compared to single-BF operation. Also, in multiple-BF operation, varying beam patterns are applied in the time direction, so that more PRACH (Physical Random Access Channel) resources are required in the time domain.

Now, in existing LTE systems, the radio base station needs to transmit signals for use for cell detection (cell search), initial access and so on (for example, synchronization signals (SSs), the broadcast channel (BCH), system information (SI), etc.), periodically, regardless of whether or not UEs are present.

Figure 5:
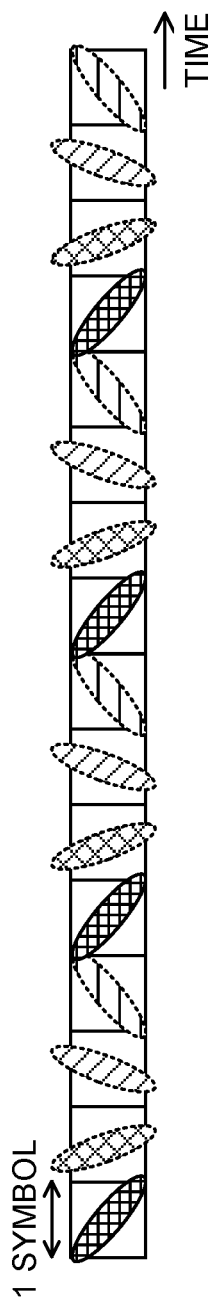
FIG. 5 is a diagram to show a case where synchronization signals, to which varying beam patterns are applied, are allocated to different resources (here, symbols) contained in one subframe.

To implement enhancement of coverage, it may be possible to transmit all of these signals multiple times by applying different BFs (beam patterns) (that is, by sweeping the signals). FIG. 5 shows a case where synchronization signals, to which varying beam patterns are applied, are allocated to different resources (here, symbols) contained in one subframe. A user terminal performs receiving processes in each symbol, so that the user terminal can receive a signal, to which a beam that is suitable for the terminal is applied, in one of these symbols. Also, after the user terminal finishes gaining initial access, the radio base station and the user terminal can communicate using appropriate beams (beam patterns to match the synchronization signals received in the user terminal).

When coverage is expanded by applying beamforming to synchronization signals and/or other signals, the same beam (beam pattern) needs to be applied to the paging channel as well, or the paging channel may fail to reach the user terminal. Therefore, it might occur that beamforming is applied to the paging channel as well. However, the radio base station is uncertain which beam patterns are suitable for user terminals in idle mode, and the radio base station may have to apply varying beam patterns to a paging channel, and map and transmit the paging channel in different resources (beam sweeping), as when transmitting synchronization signals.

Assuming that a scheme to transmit a paging channel multiple times by applying (sweeping) different BFs (beam patterns) is employed, the radio base station does not know which transmitting directivity is optimal for each idle-mode user terminal. Alternatively, the radio base station does not know which transmission timing, amongst a plurality of unit periods where varying beamforming is applied, is optimal for each user terminal in idle mode.

The present inventors have found out that, when a scheme whereby paging channel is transmitted a number of times by applying (sweeping) different BFs (beam patterns) is employed, beamforming can be executed properly even if user terminals are in idle mode.

That is, a user terminal according to one aspect of the present invention communicates with a radio base station that uses a plurality of beam patterns, and has a receiving section that performs a receiving process for paging information, which is transmitted in varying beam patterns, in a paging time period comprised of a plurality of unit periods, and a transmission section that transmits an uplink signal.

In this user terminal, it is preferable that the above paging time period is comprised of a plurality of non-consecutive unit periods or a plurality of consecutive unit periods. When the paging time period is comprised of a plurality of non-consecutive unit periods, after a beam pattern that is suitable for the user terminal in idle mode is selected, the paging message no longer needs to be transmitted.

Now, embodiments of the present invention will be described in detail below with reference to the accompanying drawings. The radio communication methods according to various embodiments may be implemented separately or may be implemented in combination.

Note that, when, a plurality of beams (beam patterns) are different herein, this should be construed to mean that, for example, at least one of following (1) to (6), applied to each of these multiple beams, is different, but these are by no means limiting: (1) the precoding; (2) the transmission power; (3) the phase rotation; (4) the beam width; (5) the beam angle (for example, the tilt angle); and (6) the number of layers. Note that, when the precoding varies, the precoding weight may vary, or the precoding scheme may vary (for example, linear precoding, non-linear precoding and so on). When linear/non-linear precoding is applied to beams, the transmission power, the phase rotation, the number of layers and so on may also vary.

Examples of linear precoding include precoding based on zero-forcing (ZF) model, precoding based on regularized zero-forcing (R-ZF) model, precoding based on minimum mean square error (MMSE) model and so on. Also, examples of non-linear precoding include dirty paper coding (DPC), vector perturbation (VP), Tomlinson-Harashima precoding (THP) and so on. Note that these are by no means the only types of precoding that are applicable.

In a radio communication system according to one aspect of the present invention, a radio base station that uses a plurality of beam patterns and a user terminal communicate with each other, where the user terminal has a receiving section that performs a receiving process for paging information, which is transmitted in varying beam patterns, in a paging time period comprised of a plurality of unit periods, and a transmission section that transmits an uplink signal, and the radio base station, communicating with the user terminal by using a plurality of beam patterns, has a transmission section that transmits paging information in varying beam patterns in a plurality of unit periods that constitute a paging time period.

Here, this aspect of the present invention may apply to the case where the paging time period is comprised of a plurality of consecutive unit periods and the case where the paging-time period is comprised of a plurality of non-consecutive unit periods.

(First Aspect)

In the paging transmission method according to the first aspect of the present invention, a radio base station transmits the same paging message (paging information) to a user terminal over a plurality of consecutive unit periods, using a plurality of beam patterns. Here, the unit periods can be, for example, subframes, slots, symbols and so on.

Figure 6:
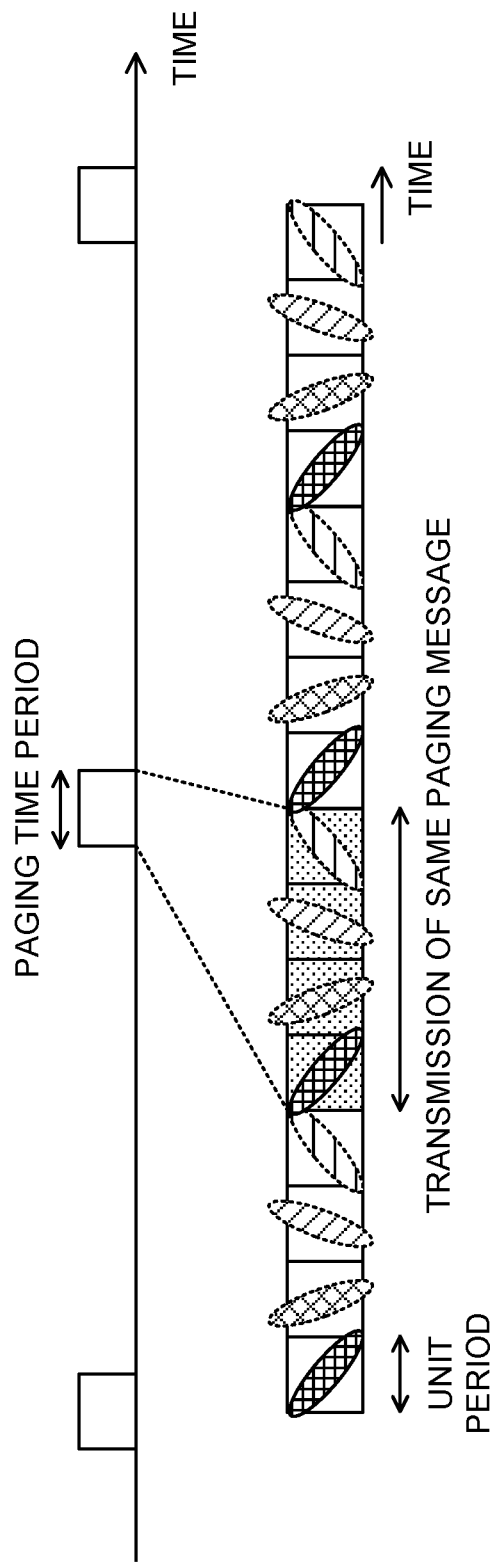
FIG. 6 is a diagram to explain the method of transmitting paging messages according to a first aspect of the present invention.

FIG. 6 is a diagram to explain the method of transmitting paging messages according to the first aspect of the present invention.

In the method of transmitting paging messages according to the first aspect, on the radio base station's end, time periods for use for paging are provided regularly (intermittently), and, in these paging time periods, the same paging message is transmitted in different beam patterns. Here, four different beam patterns (transmitting directivities) are used, and four consecutive unit periods (for example, four subframes) constitute a paging time period. Note that there are no particular limitations on the number of beam patterns used. Also, no specific limitations are placed on the time periods for paging, so that these paging time periods can be configured as appropriate by taking into account the number of beam patterns used. Also, the number of unit periods that constitute a paging time period and the number of beam patterns are not necessarily the same.

In the first aspect, the user terminal needs to know in what cycle paging time periods (bursts) are provided, how long a paging time period (burst) is, and so on. These pieces of information may be reported from the radio base station to the user terminal by way of higher layer signaling, and/or the like. Alternatively, these pieces of information—especially the length of (the number of unit periods in) a paging time period (burst)—may be determined on the user terminal's end based on the cell ID, the ID for identifying TRxP, the number of transmitting beams and so on, or may be determined in advance in the specification (for example, 10 ms).

In the method of transmitting paging messages according to the first aspect, paging time periods, where varying beam patterns are applied, are determined on the user terminal's end based on the UE ID, the DRX cycle, information related to the beams (information that is broadcast from the radio base station), the length of (the number of unit periods in) a paging time period (burst), and so on. The beam-related information may be any information, including the number of transmitting beam patterns and/or others. Note that information about paging time periods (the cycle of paging time periods, the number of unit periods and so on) may be available from the radio base station. Based on the information of paging time periods, the user terminal may read DCI (downlink control information) in a common search space or perform receiving processes for paging messages. Note that, when the user terminal performs receiving processes for paging messages without reference to DCI, the receiving process for DCI can be skipped.

In this case, the user terminal performs receiving processes for a paging message that has been transmitted in plurality of different beam patterns, so that the paging message can be received reliably. In other words, even when the user terminals is in idle mode, and, on the radio base station's end, it is not clear which beam pattern (transmitting directivity) is optimal, it is still possible to execute beamforming properly and send paging messages to the user terminal.

Note that, when the user terminal performs receiving processes for a paging message and finds an optimal beam pattern, information about this optimal beam pattern may be reported from the user terminal to the radio base station if necessary. In this case, this information related to an optimal beam pattern may be placed in another uplink signal and transmitted to the radio base station. This allows the radio base station's end to learn about optimal beam patterns.

(Second Aspect)

In the paging transmission method according to a second aspect of the present invention, the radio base station transmits the same paging message to the user terminal in a plurality of non-consecutive unit periods by using a plurality of beam patterns. Here, these unit periods can be, for example, subframes, slots, symbols, and so on.

Figure 7:
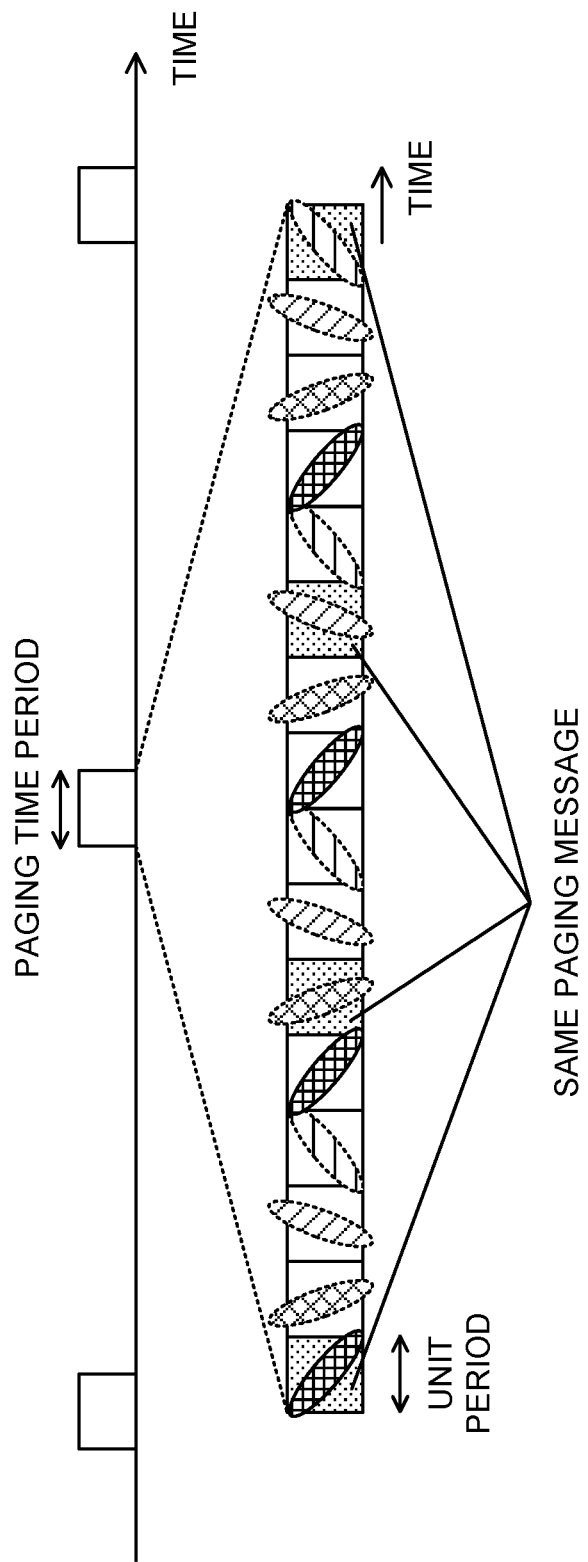
FIG. 7 is a diagram to explain the method of transmitting paging messages according to a second aspect of the present invention.
Figure 8:
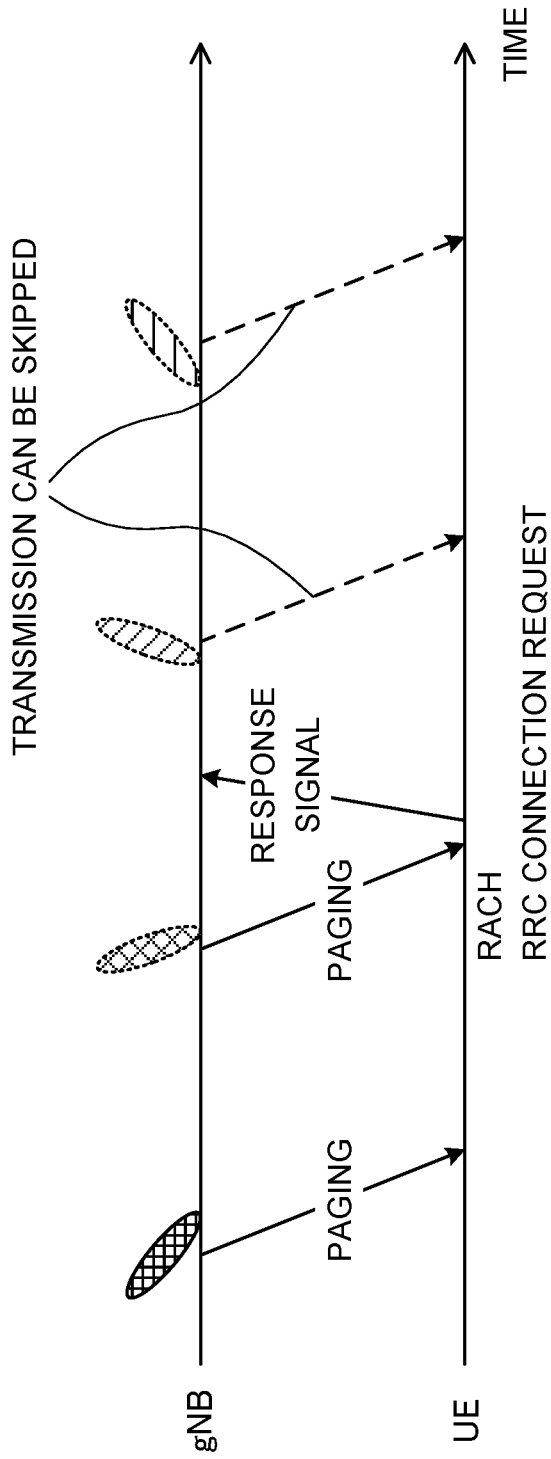
FIG. 8 is a diagram to explain the method of transmitting paging messages according to the second aspect of the present invention.

FIG. 7 and FIG. 8 are diagrams to explain the method of transmitting paging messages according to the second aspect of the present invention.

In the method of transmitting paging messages according to the second aspect, on the radio base station's end, time periods for use for paging are provided regularly (intermittently), and the same paging message is transmitted in different beam patterns in these paging time periods. Here, four different beam patterns (transmitting directivities) are used, and sixteen unit periods (for example, sixteen subframes) constitute a paging time period. In this paging time period, the same paging message is transmitted in different beam patterns in multiple non-consecutive unit periods. In the example shown in FIG. 7, unit periods for transmitting paging messages are provided at intervals (in a cycle of) five unit periods.

Note that there are no particular limitations on the number of beam patterns used. Also, there are no specific limitations as to at what intervals (or in what cycle) the unit periods for transmitting paging messages are to be provided, and these time periods can be configured as appropriate by taking into account the number of beam patterns used.

In the method of transmitting paging messages according to the second aspect, when the same paging message is transmitted by using different beam patterns in a plurality of non-consecutive unit periods in a paging time period, and the radio base station receives a response signal, which may be a RACH preamble, an RRC connection request, an ACK/NACK and/or the like, from a user terminal, the radio base station may stop subsequent transmission of this paging message.

That is, referring to FIG. 8, when the radio base station transmits the same paging message in different beam patterns in a plurality of non-consecutive unit periods and the user terminal transmits a response signal to the radio base station after receiving the second paging message, the radio base station does not transmit the third and fourth paging messages. By this means, the overhead of paging messages can be reduced compared to the first aspect.

In the second aspect, the user terminal needs to know in what cycle paging time periods (bursts) are provided, how many times a paging message is transmitted and so on. These pieces of information may be reported from the radio base station to the user terminal by way of higher layer signaling, including broadcast signals and/or the like. Alternatively, these pieces of information may be determined on the user terminal's end based on the cell ID, the ID for identifying TRxP, the number of transmitting beams and so on, or may be determined in advance in the specification (for example, 10 ms).

In the method of transmitting paging messages according to the second aspect, the user terminal's end determines the interval (cycle) of paging message-transmitting unit periods, where different beam patterns are used, based on the UE ID, the DRX cycle and so on. Note that this interval (cycle) of unit periods may be available from the radio base station. Based on the information of paging time periods, the user terminal may read DCI (downlink control information) in a common search space or perform receiving processes for paging messages. Note that, when the user terminal performs receiving processes for paging messages without reference to DCI, the receiving process for DCI can be skipped.

In this case, the user terminal performs receiving processes for a paging message that has been transmitted in plurality of different beam patterns, so that the paging message can be received reliably. In other words, even when the user terminals is in idle mode, and, on the radio base station's end, it is not clear which beam pattern (transmitting directivity) is optimal, it is still possible to execute beamforming properly and send paging messages to the user terminal.

According to the second aspect, although the radio base station can recognize that the user terminal has received a paging message when the radio base station receives a response signal, apart from this, information about an optimal beam pattern may be reported from the user terminal to the radio base station, if necessary. In this case, this information of an optimal beam pattern may be placed in another uplink signal and transmitted to the radio base station. By this means, the radio base station's end can learn about an optimal beam pattern.

Figure 9:
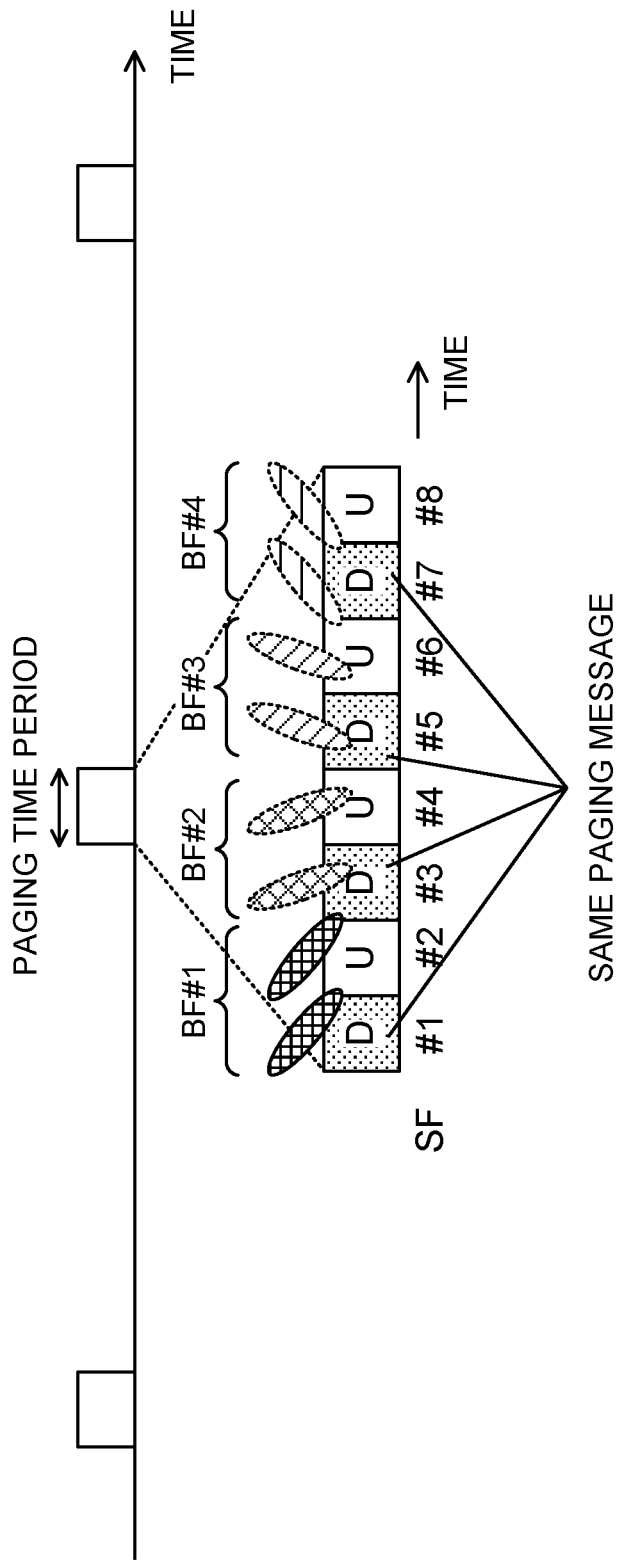
FIG. 9 is a diagram to explain the method of transmitting paging messages according to the second aspect of the present invention.

Referring to FIG. 9, in the second aspect, downlink transmission and uplink transmission may be switched per unit period in a paging time period. In FIG. 9, the paging time periods are each comprised of eight unit periods, and four beam patterns are used. To be more specific, the paging time periods are configured to perform downlink transmission in first unit period #1, third unit period #3, fifth unit period #5 and seventh unit period #7, and perform uplink transmission in second unit period #2, fourth unit period #4, sixth unit period #6 and eighth unit period #8 (TDD (Time Division Duplex)).

Also, the same beam pattern is used in first unit period #1 and second unit period #2 (first beam pattern BF #1), the same beam pattern is used in third unit period #3 and fourth unit period #4 (second beam pattern BF #2), the same beam pattern is used in fifth unit period #5 and sixth unit period #6 (third beam pattern BF #3), and the same beam pattern is used in seventh unit period #7 and eighth unit period #8 (fourth beam pattern BF #4).

Although FIG. 9 shows a case where UL transmission and DL transmission are performed alternately, no particular limitations apply to the transmission pattern of UL transmission and DL transmission. For example, DL transmission may be performed in greater proportion, or UL transmission may be performed in greater proportion, or the transmission pattern of UL transmission and DL transmission can be configured appropriately by taking into account uplink and downlink traffic conditions and/or the like. Also, the transmission pattern of UL transmission and DL transmission can be reported from the radio base station to the user terminal using a broadcast signal, higher layer signaling and so on. For example, it is possible to make transmission patterns of UL transmission and DL transmission a bit map, and report information to represent this bit map from the radio base station to the user terminal via higher layer signaling and so on.

In this way, by performing UL transmission and DL transmission alternately within a paging time period, the user terminal can receive the paging message efficiently, so that the user terminal's battery consumption can be reduced.

The first aspect and the second aspect can be combined as appropriate. That is to say, the method of transmitting paging a message by applying different beam patterns in a plurality of non-consecutive unit periods and the method of transmitting a paging message in varying beam patterns in a plurality of consecutive unit periods can be combined and implemented.

In this case, identification information for identifying between the transmission method of the first aspect and the transmission method of the second aspect may be broadcast from the radio base station to the user terminal in the MIB or SIB. For example, the transmission method of the first aspect may be used to transmit information that is common between user terminals, such as system information change, ETWS, CMAS and so on, and the transmission method of the second aspect may be used to transmit information that is user terminal-specific, such as paging record and/or others. By this means, it is possible to reduce the overhead of signaling related to user-specific information. In this case, the user terminal switches between the receiving processes that correspond to the first aspect transmission method and the receiving processes that correspond to the second aspect transmission method.

(Third Aspect)

In the paging transmission method according to a third aspect of the present invention, a user terminal performs beam measurements based on signals from the radio base station in paging time periods, and feeds back information about an optimal beam pattern to the radio base station. In the paging transmission method of the third aspect, a paging time period contains a plurality of unit periods, which are each linked to a beam pattern (beam index).

Figure 10:
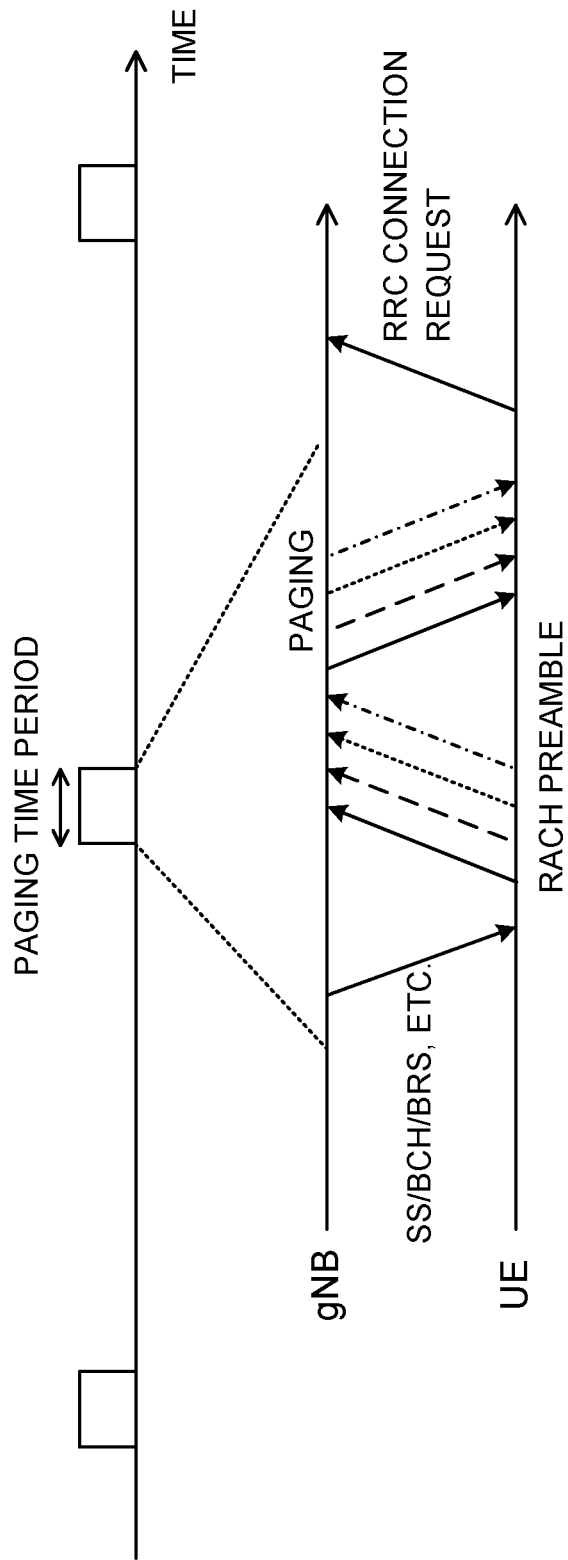
FIG. 10 is a diagram to explain the method of transmitting paging messages according to a third aspect of the present invention.

In the paging transmission method of the third aspect, as shown in FIG. 10, first, a user terminal calculates information related to the time interval, cycle, timing and so on to receive SS (synchronization signal), the broadcast channel, the BRS (reference signal for beam pattern measurement) and/or others, based on the UE ID, the DRX cycle and/or other channels/signals, and detects an optimal beam based on the calculation result. Next, the user terminal transmits a RACH preamble to the radio base station by using a RACH resource (transmission timing) in this optimal beam pattern. Following that, the radio base station receives the RACH preamble and determines an optimal beam index for the user terminal.

The radio base station transmits a paging message to the user terminal only in the unit period linked to the optimal beam index. Note that, in this case, the user terminal needs to perform receiving processes in all of a plurality of unit periods in which the paging message, transmitted from the radio base station in varying beam patterns, is received. Alternatively, the user terminal may receive the paging message only in the unit period linked to the optimal beam index. Following this, the user terminal performs receiving processes for the paging message, and then transmits an RRC connection request to the radio base station.

According to this aspect, the radio base station can know optimal beam patterns before transmitting paging messages, so that the overhead pertaining to paging messages can be reduced compared to the first aspect.

The paging transmission method of the third aspect is configured to transmit a RACH preamble. Given that this RACH preamble is configured separately from the RACH preamble that is used in usual RACH procedures, in order to distinguish between these two, the resource for the RACH preamble for paging may be configured apart from the resource for the normal RACH preamble. Note that, since the paring RACH preamble is for the purpose of reporting an optimal beam, power ramping needs not be applied.

Figure 11:
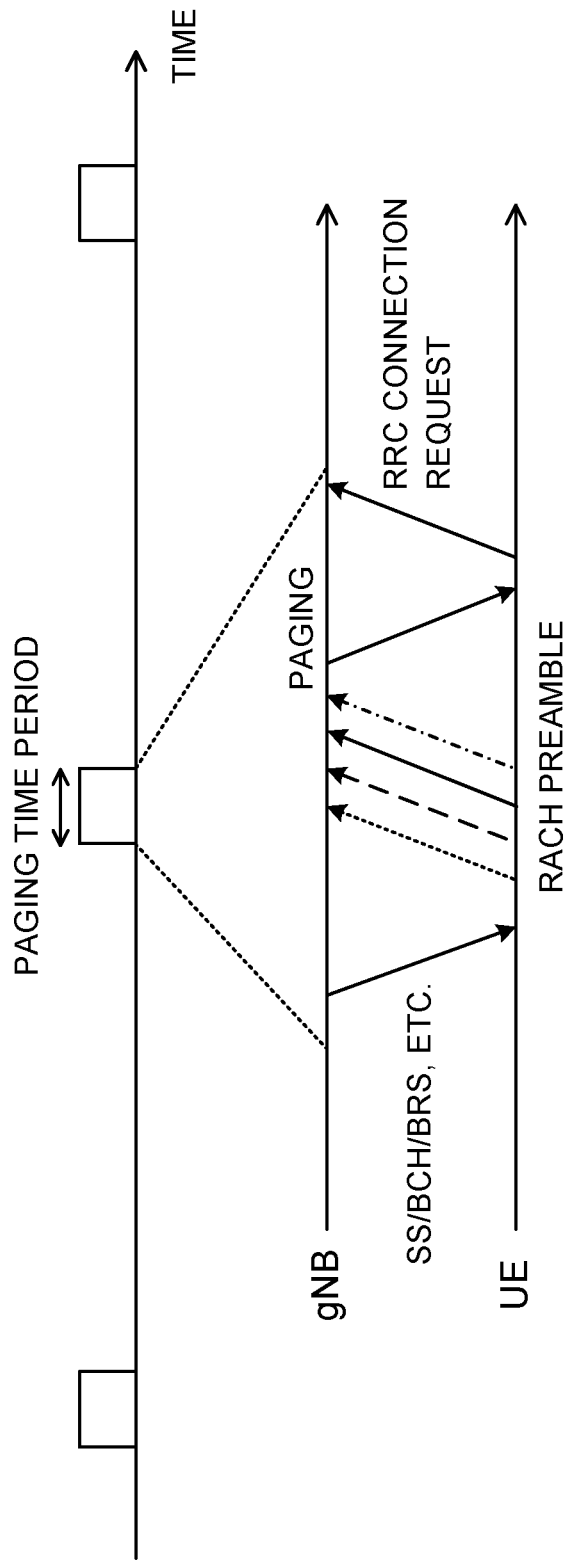
FIG. 11 is a diagram to explain the method of transmitting paging messages according to the third aspect of the present invention.

Also, in the paging transmission method of the third aspect, when the radio base station receives a RACH preamble and determines an optimal beam pattern, the radio base station may transmit a paging message at any timing— that is, in any unit period as desired—as shown in FIG. 11. Note that, in this case, the user terminal performs receiving processes only in the unit period in which the paging message transmitted in the optimal beam pattern from the radio base station is received. This makes it possible to shorten the time it takes for the user terminal to perform receiving process for the paging message.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 12:
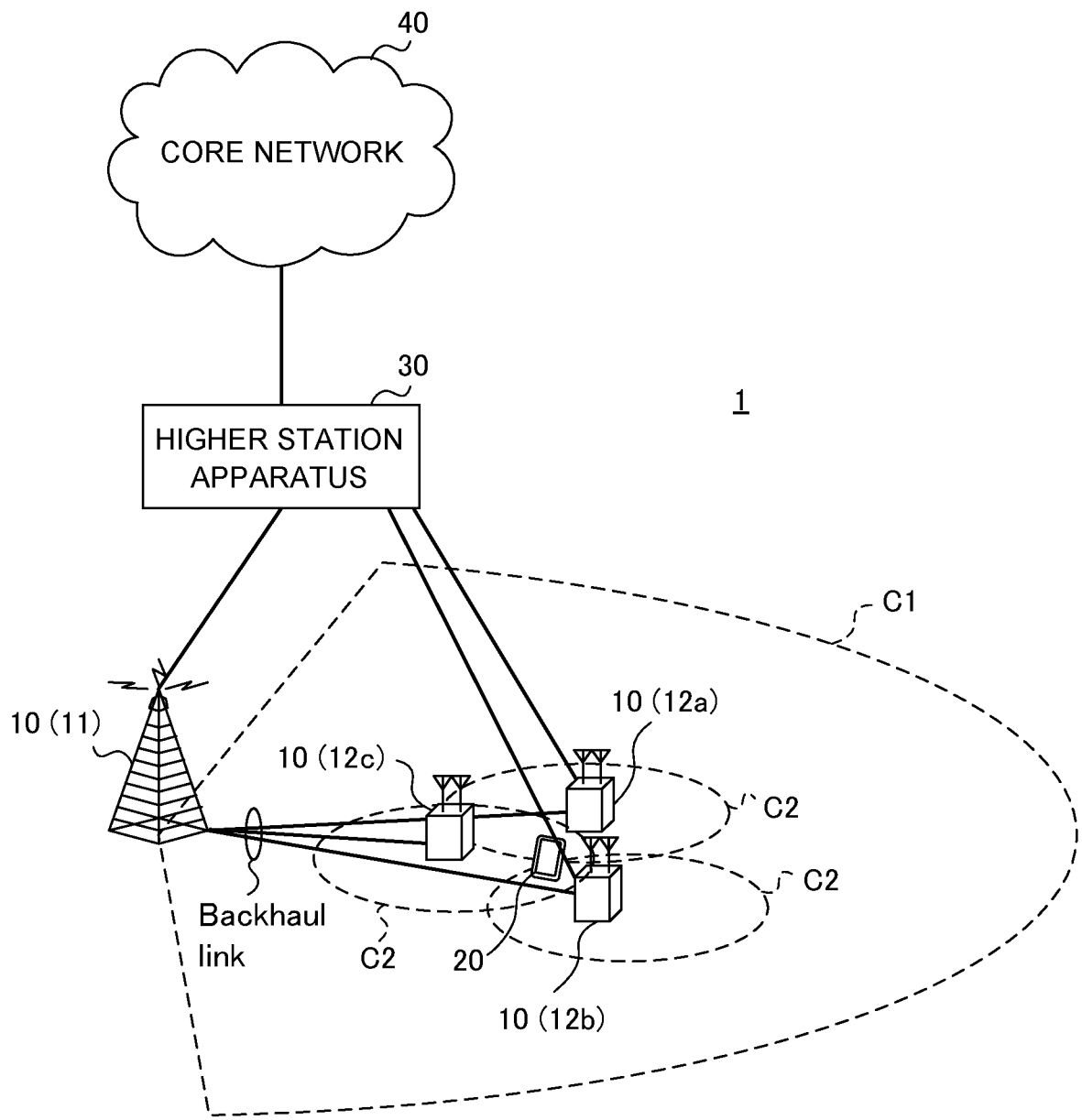
FIG. 12 is a diagram to show an example of a schematic structure of a radio communication system according to an embodiment of the present invention.

FIG. 12 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication is carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that uplink and downlink radio access schemes are not limited to the combination of these, and other radio access schemes may be used.

In the radio communication system 1, a downlink shared channel (PDSCH (Physical Downlink Shared CHannel), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data and higher layer control information are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication systems 1, the cell-specific reference signal (CRS (Cell-specific Reference Signal)), the channel state information reference signal (CSI-RS (Channel State Information-Reference Signal)), the demodulation reference signal (DMRS (DeModulation Reference Signal)), the positioning reference signal (PRS (Positioning Reference Signal)) and so on are communicated as downlink reference signals. Also, in the radio communication system 1, the measurement reference signal (SRS (Sounding Reference Signal)), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 13:
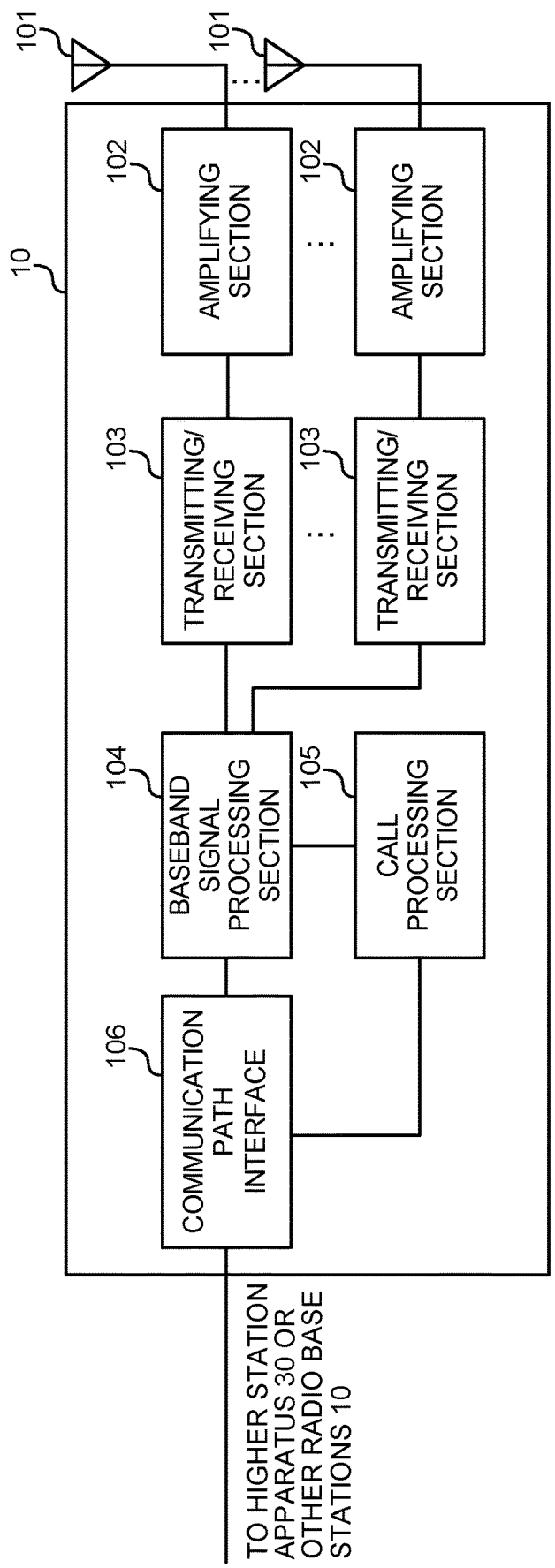
FIG. 13 is a diagram to show an example of an overall structure of a radio base station according to an embodiment of the present invention.

FIG. 13 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas.

The transmitting/receiving sections 103 control transmission of paging messages, receipt of response signals according to the paging transmission method of the second aspect, receipt of RACH preambles according to the paging transmission method of the third aspect, and receipt of RRC connection requests, and so on. In addition, the transmitting/receiving sections 103 may transmit synchronization signals, broadcast channel signals, reference signals for beam pattern measurements, and/or other channels/signals, for beam measurements at the user terminal.

Figure 14:
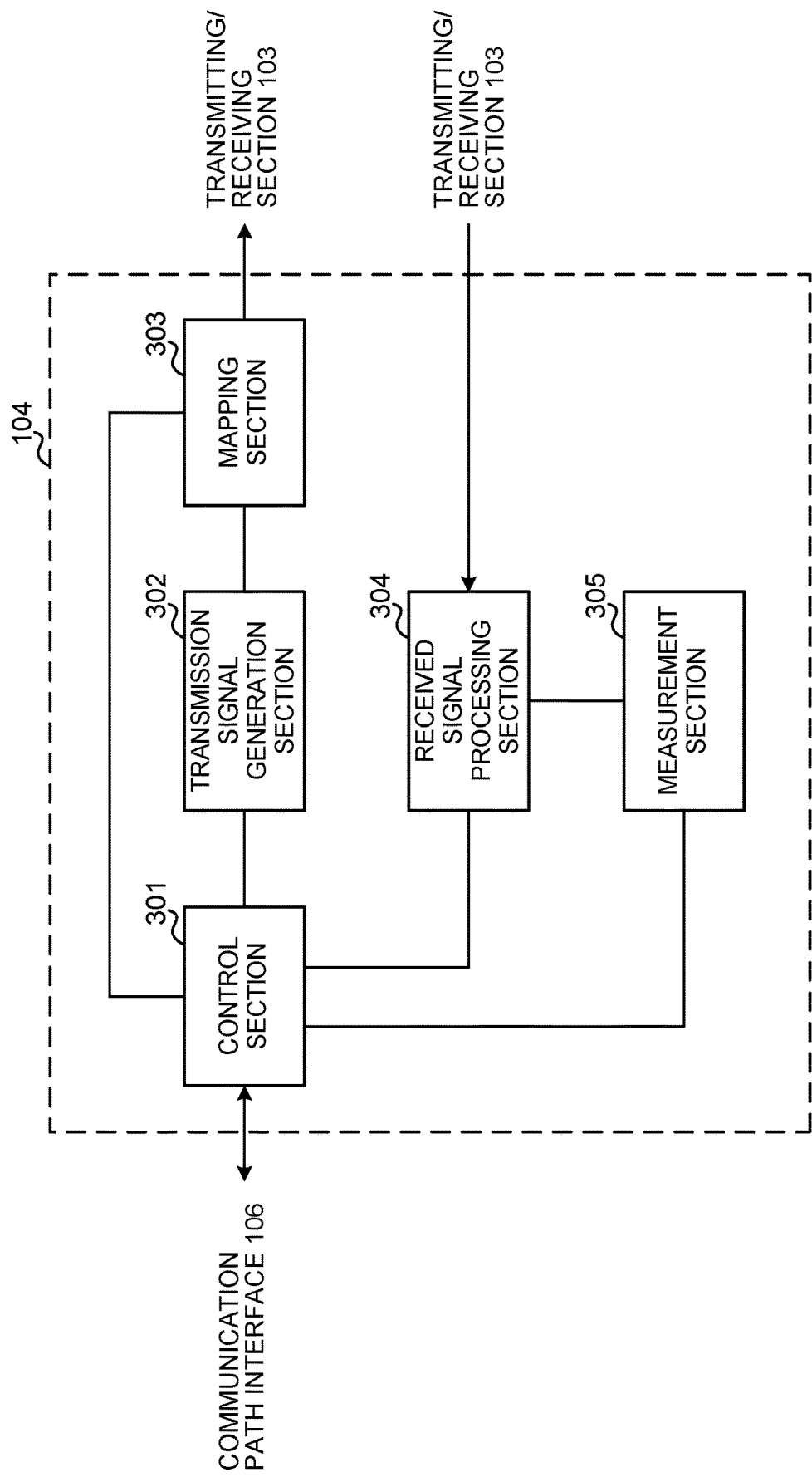
FIG. 14 is a diagram to show an example of a functional structure of a radio base station according to one embodiment of the present invention.

FIG. 14 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. Also, the control section 301 controls the generation of downlink control signals (for example, delivery acknowledgement information and so on), downlink data signals and so on, based on, for example, whether or not retransmission control is necessary, which is decided in response to uplink data signals. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DM-RS, etc.) and so on.

In addition, the control section 301 controls the scheduling of uplink data signals that are transmitted in the PUSCH, uplink control signals that are transmitted in the PUCCH and/or the PUSCH (for example, delivery acknowledgment information), random access preambles that are transmitted in the PRACH, uplink reference signals, and so on.

The control section 301 may exert control so that transmitting beams and/or receiving beams are formed using digital BF (for example, precoding) by the baseband signal processing section 104 and/or analog BF (for example, phase rotation) by the transmitting/receiving sections 103.

For example, the control section 301 exerts control so that a paging message is transmitted by using a plurality of different beam patterns in a predetermined period (for example, in a paging time period). Note that, the control section 301 exerts control so that the paging message transmitted in a plurality of different beam patterns, is linked to a unit period in the paging time period. For example, the control section 301 may exert control so that, in a predetermined period (for example, a sweep period), one or more beam-specific signals and/or channels (for example, beam-specific SSs, beam-specific RSs, beam-specific BCHs (broadcast signals), etc.) are swept and transmitted. In addition, the control section 301 exerts control so that a RACH preamble, which the user terminal transmits using an optimal beam pattern, is received, and a beam index that is optimal for the radio base station is determined.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process and the modulation process by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio), channel states and so on. The measurement results may be output to the control section 301.

(User Terminal)

Figure 15:
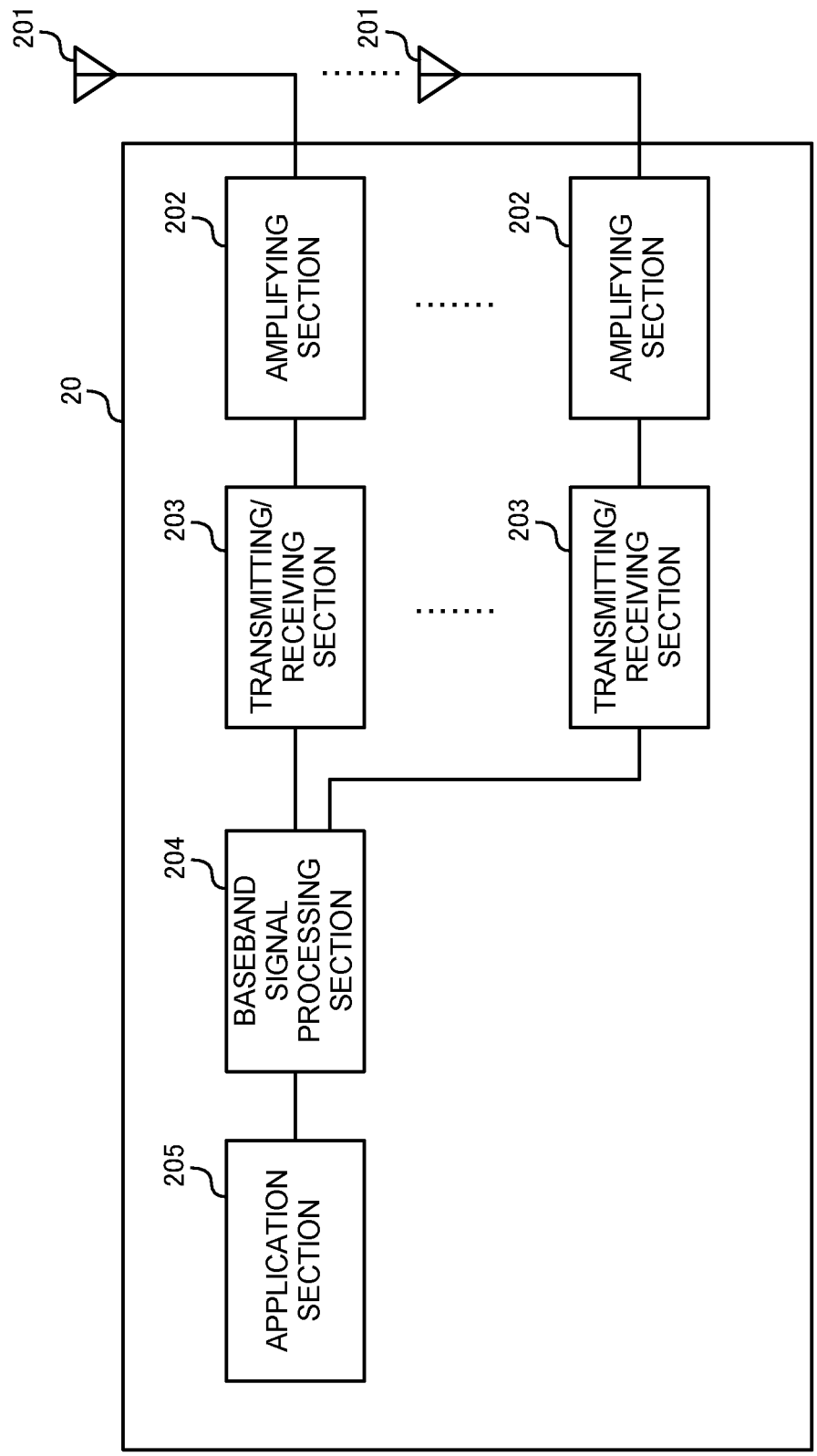
FIG. 15 is a diagram to show an example of an overall structure of a user terminal according to an embodiment of the present invention.

FIG. 15 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process and so on. Downlink user data is forwarded to the application section 205. The application section 205 performs processes related to higher layers above the physical layer and the MAC layer and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 control receipt of paging messages, transmission of response signals according to the paging transmission method of the second aspect, transmission of RACH preambles according to the paging transmission method of the third aspect, and transmission of RRC connection requests, and so on. In addition, the transmitting/receiving sections 103 may receive synchronization signals, broadcast channel signals, reference signals for beam pattern measurements, and/or other channels/signals, for beam measurements.

Figure 16:
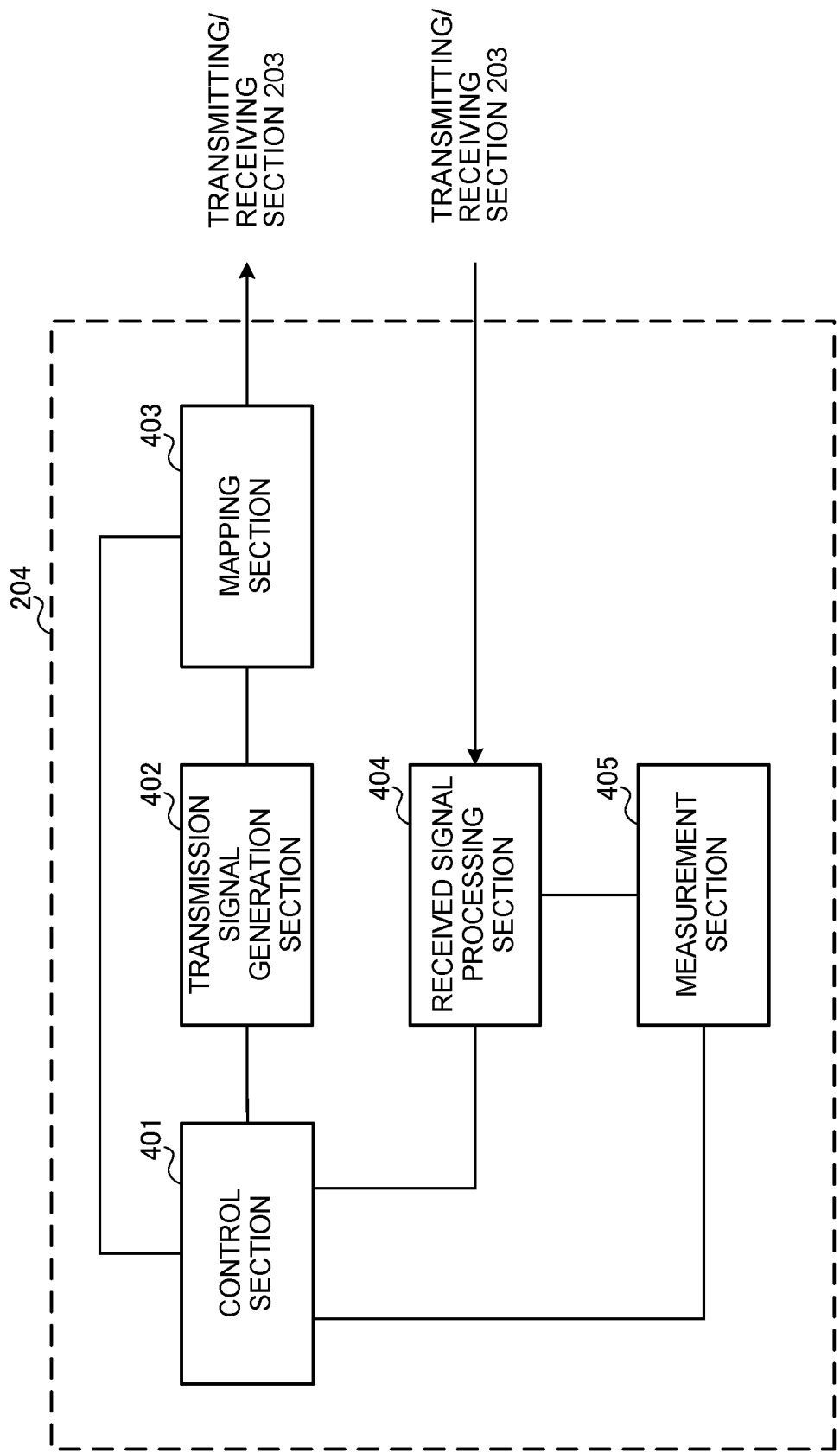
FIG. 16 is a diagram to show an example of a functional structure of a user terminal according to an embodiment of the present invention.

FIG. 16 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement information and so on) and/or uplink data signals based on whether or not retransmission control is necessary, which is decided in response to downlink control signals and/or downlink data signals, and so on.

The control section 401 may exert control so that transmitting beams and/or receiving beams are formed using the digital BF (for example, precoding) by the baseband signal processing section 204 and/or the analog BF (for example, phase rotation) by the transmitting/receiving sections 203.

For example, the control section 401 exerts control so that, when a paging time period is comprised of a plurality of consecutive unit periods, receiving processes are performed for a paging message that is transmitted in varying beam patterns in a plurality of consecutive unit periods (first aspect). The control section 401 exerts control so that, when a paging time period is comprised of a plurality of non-consecutive unit periods, receiving processes are performed for a paging message that is transmitted in varying beam patterns in a plurality of unit periods in the paging time period (second aspect). For example, the control section 401 may exert control so that at least one of a plurality of beam-specific signals and/or channels (for example, beam-specific SSs, beam-specific RSs, beam-specific BCHs (broadcast signals), etc.), which are transmitted in a predetermined period (for example, a sweep period), is received.

Furthermore, when the paging transmission method of the second aspect is used, the control section 401 exerts control so that, in a paging time period comprised of a plurality of non-consecutive unit periods, response signals are transmitted when paging information is received. The control section 401 exerts control so that the receiving processes for paging information that is transmitted in varying beam patterns in a plurality of non-consecutive unit periods, and the receiving processes for paging information that is transmitted in varying beam patterns applied in a plurality of consecutive unit periods are switched. Furthermore, the control section 401 exerts control so that, when, for example, TDD is used, UL transmission is performed in paging time periods (second aspect).

In addition, the control section 401 exerts control so that the length of (the number of unit periods in) a paging time period (burst) is determined based on cell IDs, IDs for identifying TRxP, the number of transmitting beams and so on (first aspect). In addition, the control section 401 exerts control so that paging time periods to use different beam patterns are determined based on UE IDs, the DRX cycle, information about the beams (information reported from the radio base station), the length of (the number of unit periods in) a paging time period (burst), and so on (first aspect).

In addition, the control section 401 exerts control so that the cycle of paging time periods (bursts), the number of times a paging message is transmitted, and so on are determined based on cell IDs, TRxPIDs and/or the like (second aspect). The control section 401 exerts control so that the interval (cycle) of unit periods for transmitting paging messages by using different beam patterns is determined based on UE IDs, the DRX cycle and so on (second aspect).

In addition, the control section 401 exerts control so that information related to the time interval, cycle, timing and so on to receive SSs (synchronization signals), the broadcast channel, BRSs (reference signals for beam pattern measurements) and/or other channels/signals, based on UE IDs, the DRX cycle and so on, and an optimal beam is detected based on this calculation result (third aspect). The control section 401 transmits a RACH preamble to the radio base station in a RACH resource (transmission timing) using this optimal beam pattern (third aspect).

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 performs measurements using the beamforming RS transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, reception SINR), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 17:
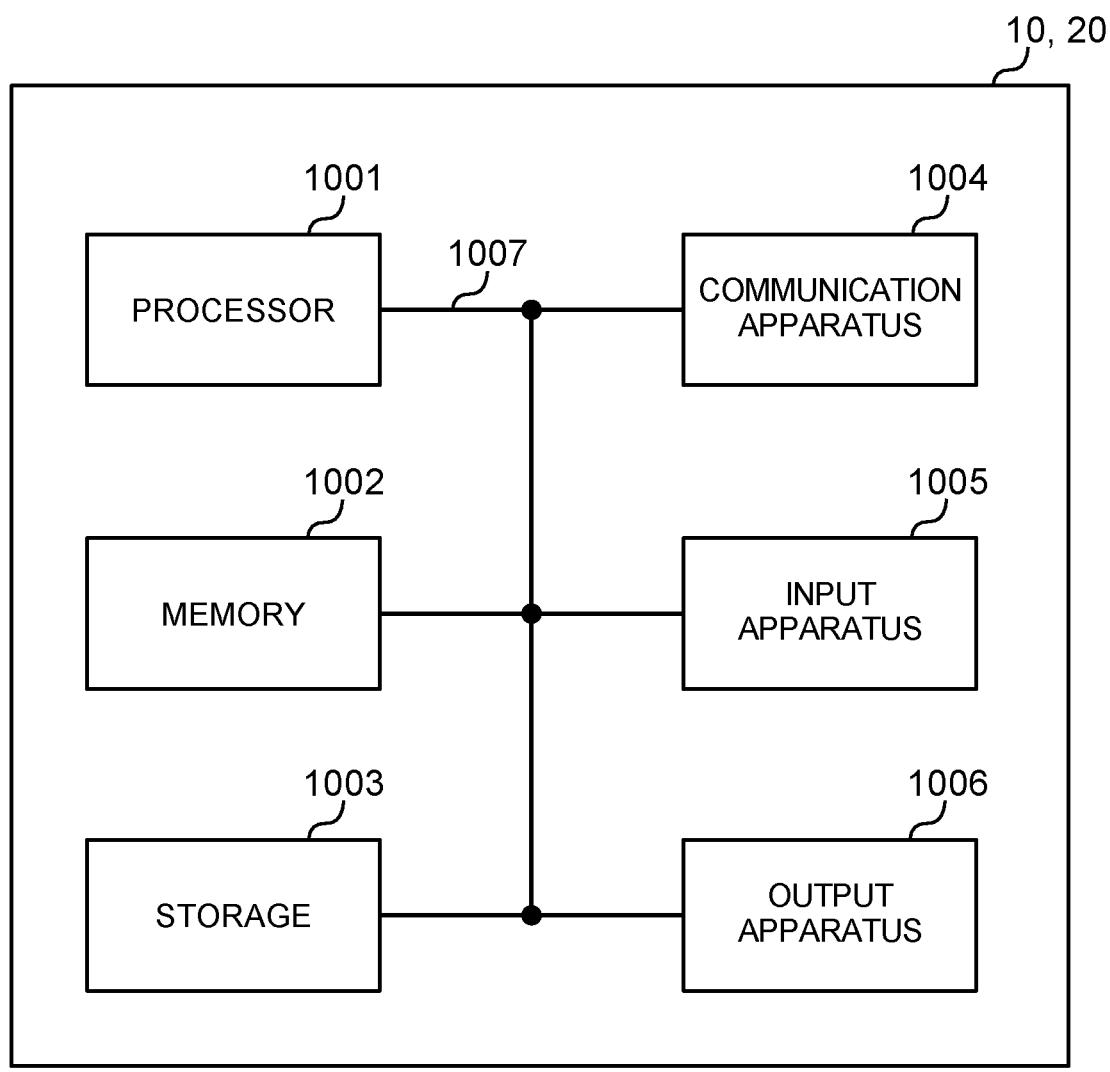
FIG. 17 is a diagram to show an example hardware structure of a radio base station and a user terminal according to an embodiment of the present invention.

That is, the radio base stations, user terminals and so according to the embodiments of the present invention may function as a computer that executes the processes of the radio communication method of the present invention. FIG. 17 is a diagram to show an example hardware structure of a radio base station and a user terminal according to an embodiment of the present invention. Physically, a radio base station 10 and a user terminal 20, which have been described, may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawing, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules, and the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD (Frequency Division Duplex)) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols (OFDM (Orthogonal Frequency Division Multiplexing) symbols, SC-FDMA (Single Carrier Frequency Division Multiple Access) symbols, and so on) in the time domain.

A radio frame, a subframe, a slot and a symbol all represent the time unit in signal communication. A radio frame, a subframe, a slot and a symbol may be each called by other applicable names. For example, one subframe may be referred to as a "transmission time interval (TTI)," a plurality of consecutive subframes may be referred to as a "TTI," or one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of one ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, symbols and the like described above are merely examples. For example, configurations pertaining to the number of subframes included in a radio frame, the number of slots included in a subframe, the number of symbols and RBs included in a slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Information, signals and so on can be output from higher layers to lower layers and/or from lower layers to higher layers. Information, signals and so on may be input and output via a plurality of network nodes.

The information, signals and so on that are input and/or output may be stored in a specific place (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and signals and/or combinations of these.

Physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes. In a network consisting of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-154017, filed on Aug. 4, 2016, including the specification, drawings and abstract, is incorporated herein by reference in its entirety.

The invention claimed is:

1. A terminal comprising:
a processor that controls, in a predetermined resource, a monitoring of a downlink control channel used in a transmission of downlink control information for paging based on a broadcast signal; and
a receiver that receives paging message based on the downlink control information,
wherein the processor performs monitoring of the downlink control channel in non-consecutive symbols.

2. The terminal according to claim 1, wherein the processor performs monitoring of the downlink control channel in consecutive slots.

3. A radio communication method for a terminal, comprising:
  controlling, in a predetermined resource, a monitoring of a downlink control channel used in a transmission of downlink control information for paging based on a broadcast signal;
  receiving paging message based on the downlink control information; and
  controlling the monitoring of the downlink control channel in non-consecutive symbols.

4. A base station comprising:
  a transmitter that transmits information on a monitoring, in a predetermined resource, of a downlink control channel used in a transmission of downlink control information for paging, by using a broadcast signal; and
  a processor that controls a transmission of paging message by using the downlink control information,
  wherein the transmitter transmits the downlink control channel in non-consecutive symbols.

5. A system comprising a terminal and a base station, wherein
  the terminal comprises:
    a processor of the terminal that controls, in a predetermined resource, a monitoring of a downlink control channel used in a transmission of downlink control information for paging based on a broadcast signal; and
    a receiver that receives paging message based on the downlink control information,
    wherein the processor of the terminal performs monitoring of the downlink control channel in non-consecutive symbols, and
  the base station comprises:
    a transmitter that transmits the information on the monitoring of the downlink control channel, by using the broadcast signal; and
    a processor of the base station that controls the transmission of the paging message by using the downlink control information.

* * * * *